United States Patent [19]

Okawa

[11] Patent Number: 5,692,162
[45] Date of Patent: Nov. 25, 1997

[54] VIDEO ENTERTAINMENT SYSTEM ADAPTER AND IMAGE DISPLAY METHOD OF A VIDEO ENTERTAINMENT SYSTEM USING A VIDEO ENTERTAINMENT SYSTEM ADAPTER

[75] Inventor: Tetsuya Okawa, Tokyo, Japan

[73] Assignee: Sega Enterprises, Tokyo, Japan

[21] Appl. No.: 440,914

[22] Filed: May 15, 1995

[30] Foreign Application Priority Data

May 17, 1994 [JP] Japan .................................... 6-103113

[51] Int. Cl.$^6$ .................................................. G06F 3/00
[52] U.S. Cl. .................................. 395/503; 463/45
[58] Field of Search ........................ 273/434, 435, 273/437; 345/113, 114; 395/163, 501, 503; 463/31, 44, 45

[56] References Cited

U.S. PATENT DOCUMENTS 5,357,604  10/1994  San et al. ............................ 395/162
5,412,399   5/1995  Hara .................................... 345/113
5,471,579  11/1995  Kimura et al. ....................... 395/163

FOREIGN PATENT DOCUMENTS 6246064   9/1994   Japan ................................... 273/435

Primary Examiner—Mark R. Powell
Attorney, Agent, or Firm—Price, Gess & Ubell

[57] ABSTRACT

A video entertainment system adapter unit is provided for use on a video entertainment system, such as video game machines, to increase the processing power and complexity of the video images. The adapter unit includes at least a computer for generating image data and a video display processor for controlling display images from the image data generated. An interface is provided for connecting the adapter computer with the video entertainment computer, while a priority circuit permits comparing the priority of a display image from the video entertainment system with the priority of a display image from the adapter on a pixel basis, and an image selection circuit can select from the respective display images in accordance with the priority to provide a corresponding video display.

21 Claims, 4 Drawing Sheets

FIG. 3
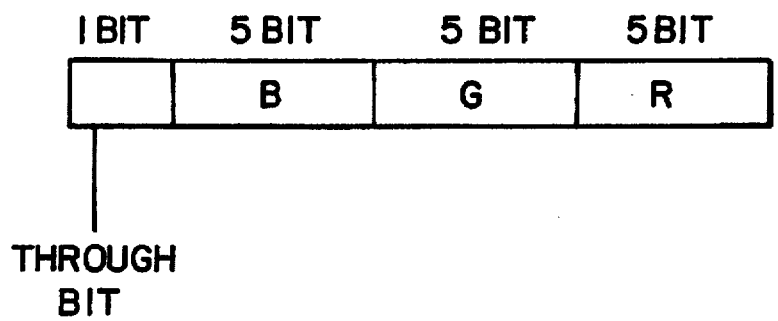
FIG. 4
| PRIORITY BIT | 0 | 0 | 0 | 0 | 1 | 1 | 1 | 1 |
|---|---|---|---|---|---|---|---|---|
| THROUGH BIT | 0 | 0 | 1 | 1 | 0 | 0 | 1 | 1 |
| COLOR INFO BIT | 0 | 1 | 0 | 1 | 0 | 1 | 0 | 1 |
| DISPLAY | A | B | A | A | A | A | A | B |
FIG. 5
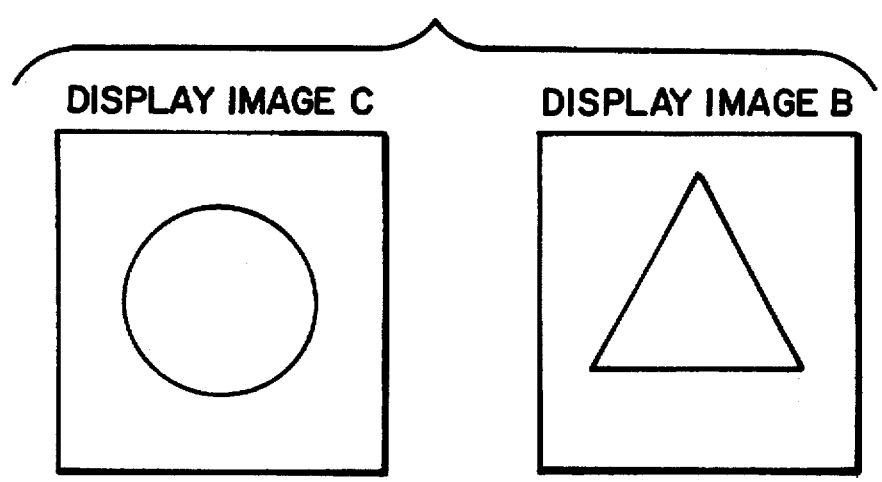

COMPOSITE SCREEN

DISPLAY IMAGE C

DISPLAY IMAGE B

COMPOSITE SCREEN

VIDEO ENTERTAINMENT SYSTEM ADAPTER AND IMAGE DISPLAY METHOD OF A VIDEO ENTERTAINMENT SYSTEM USING A VIDEO ENTERTAINMENT SYSTEM ADAPTER

BACKGROUND OF THE INVENTION

1. Field of the Invention

This invention relates to an adapter that is connected to a video entertainment system unit and a image display method of a video entertainment system using an adapter. More specifically, this invention relates to a technique which allows complicated video images to be displayed speedily by providing a video display processor (hereafter called VDP) on a video entertainment system unit as well as on an adapter.

2. Description of the Prior Art

As a video entertainment program becomes more and more complicated, a high-performance video entertainment system is required. To meet this need, various types of video entertainment systems have been introduced. Some of them display many high-quality color images, and some others provide a high-speed CPU or VDP to perform speedy operations such as three-dimensional polygon display. However, introduction of many types of video entertainment systems with new functions in quick succession may confuse users and make existing video entertainment systems obsolete rapidly.

To solve these problems, an adapter specifically designed to improve a video entertainment system unit has been introduced. Installing this type of adapter on a video entertainment system unit allows complicated video entertainment programs to be executed. More specifically, a CPU is provided in the adapter to perform high-speed operation which cannot be done in the CPU contained in the video entertainment system unit, to speed up the operation of the game, and to display more complicated images. This does not mean that the CPU in the video entertainment system unit is in the sleep state; instead, it is responsible for a part of the program which need not be executed speedily or for displaying simple images, thus improving the operation of the video entertainment system as a whole.

In addition, on some latest image boards, a VDP is provided not only in a video entertainment system unit but also in a board-type adapter to increase the display speed. In this case, the VDP in the video entertainment system unit controls the display images on the video entertainment system unit, while the VDP in the adapter controls the display image on the adapter. And, two display images can be output alternately by switching them at a specified interval.

Problems to Be Solved by the Invention

Today, in a video entertainment program, it is required that a sprite move in the left and right or up and down directions and in the forward and backward directions in front of the background image made by three-dimensional images such as polygons and that parts of two screens are exchanged to compose a more complicated image. To execute this type of video entertainment program, the video entertainment system unit must have an adapter with a VDP, always monitor the forward and backward relation of display images from the video entertainment system unit and those from the adapter as the game progresses, and exchange those two images as necessary. To allow a game character to move in the three-dimensional background freely and smoothly and to exchange foreground images and background images, display image data must be processed on a pixel basis.

However, on an adapter for a conventional video entertainment system which has a VDP as described above, the screen from the video entertainment system unit and the screen from the adapter are exchanged only one full screen at time and only at a specified interval as the game progresses. It is impossible for a sprite (such as a game character) displayed and controlled by the VDP of the video entertainment system unit to move freely in the fine background image generated by the VDP of the adapter, or to exchange only limited parts of two images.

In addition, an adapter must be disconnected from the video entertainment system unit if not required by a video entertainment program to be executed. For ease of use, this cumbersome work must be eliminated.

In view of the foregoing, it is a general object of this invention is to provide a video entertainment system adapter which increases the operation capability and the image output performance.

More specifically, it is an object to allow a sprite (such as a game character) displayed and controlled by the VDP of a video entertainment system unit or an adapter to move in the free foreground generated by the other VDP of the adapter or the video entertainment system unit, on a pixel basis, by comparing the priority of a display image from the video entertainment system unit and the priority of a display image from the adapter, and to provide a video entertainment system adapter which enables a video entertainment program featuring highly-complicated screen effects to be executed by exchanging only a part of the foreground image with a part of the background image.

It is an object to further speed up the operation speed. It is an object to provide an easy-to-use video entertainment system adapter which allows itself to remain connected to the video entertainment system unit at execution time even if the program does not require the adapter.

It is an object to increase display image performance. It is an object to provide a video entertainment system adapter which has high operation ability. It is an object to improve the operation ability. It is an object to increase the image processing capacity.

SUMMARY OF THE INVENTION

To achieve the above objects, the invention is a video entertainment system adapter for use on a video entertainment system comprising image display means for displaying images, main RAM for storing program data and image data, a main CPU for executing programs and for generating image data, and a first VDP for controlling display images according to image data generated by the main CPU, the video entertainment system adapter comprising: sub CPU for generating image data; a second VDP for controlling display images on the adapter according to image data generated by the sub CPU; an interface for connecting said sub CPU and said main CPU; priority determination means for comparing the priority of a display image from the unit of said video entertainment system with the priority of a display image from said adapter on a pixel basis; and image selection means for selecting one of two display images, either a display image from the video entertainment system unit or a display image from the adapter, to be displayed in front of the other.

The invention is a video entertainment system adapter, further comprising sub RAM for storing program data required for said sub CPU to run and image data controlled by said sub CPU. In addition, the invention is a video entertainment system adapter, further comprising a bus selector for activating said interface with the use of commands from said main CPU.

The invention is a video entertainment system adapter wherein said second video display processor has more colors and higher display image transfer ability than that of said first video display processor.

The invention is a video entertainment system adapter wherein said sub CPU consists of two sub CPUs.

The invention is a video entertainment system adapter wherein said interface makes said sub CPUs and said main CPU do parallel processing.

The invention is a video entertainment system adapter wherein said second video display processor sets on a pixel basis the priority bit, a signal specifying whether a display image from the adapter be displayed behind or in front of a display image from the video entertainment system unit, the through bit, and a signal specifying whether said priority bit of the display image is reversed according to the image data generated by said sub CPU; and said priority determination means compares the priority based on said priority bit, said through bit, and the color information signal sent from said first video display processor, a signal specifying whether the display image from the video entertainment system unit is transparent.

The invention is an image display method of a video entertainment system using a video entertainment system adapter of displaying image by connecting an video entertainment system adapter having a CPU and a video display processor to a video entertainment system unit, which generates image data and displays image based on the image data, said video display method of a video entertainment system comparing the steps of: setting the priority bit, a signal specifying whether a display image from the adapter be displayed behind or in front of a display image from the video entertainment system unit, the through bit, a signal specifying whether said priority bit of the display image is reversed, and the color information signal, a signal specifying whether the display image from the video entertainment system unit is transparent; comparing the priority of a display image from said video entertainment system unit with the priority of a display image from said adapter on a pixel basis, according to said priority bit, said through bit, and said color information bit; and displaying one of two display images in front of the other, either a display image from the video entertainment system unit or a display image from the adapter according to the priority determined.

The invention is an image display method of a video entertainment system using a video entertainment system adapter as claimed in claim 8, wherein a second video display processor which has more colors and higher display image transfer ability than that of a first video display processor of said video entertainment system unit is provided; image including game scores and characters where many colors are not used are controlled by said first video display processor; and the background where many colors are used and three-dimensional images are controlled by said second video display processor.

Effect

The invention with the configuration described above has the following effect. That is, when the interface is activated with the video entertainment system adapter with the video entertainment system unit, the sub CPUs in the adapter connect to the main CPU in the video entertainment system unit. In the video entertainment system unit, the main CPU generates image data and, based on this image data, the first VDP controls display images on the video entertainment system unit. In the adapter, the sub CPUs generate image data and, based on this image data, the second VDP controls display images on the adapter.

When two VDPs control display images on the video entertainment system unit and on the adapter independently, the priority determination means compares the priority of a display image from the video entertainment system unit with the priority of a display image from the adapter on a pixel basis. And, according to the determined priority, the image selection means selects one of two display images, either a display image from the video entertainment system unit or a display image from the adapter, to be displayed in front of the other. This enables image data to be displayed, on a pixel basis, with a display image selected by the image display means to the front. In addition, both the video entertainment system unit and the adapter according to this invention have a CPU(s) and a VDP, it is possible to process a large volume of data involved in an increased number of colors and to perform three-dimensional processing.

The invention makes available a sub RAM in the adapter in addition to the main RAM in the video entertainment system unit. Because each CPU has its own RAM, the CPUs in the adapter and in the video entertainment system unit can perform parallel processing via the interface.

The invention activates the bus selector with the use of a command from the main CPU. In other words, the adapter is not enabled unless the bus selector receives an interface activation command from the main CPU in the video entertainment system unit. Therefore, a video entertainment program not requiring the adapter can be executed without having to disconnect the adapter from the video entertainment system unit.

The invention makes a second video display processor have more colors and higher display image transfer ability than that of a first video display processor to increase display image performance.

The invention provides two sub CPUs in the adapter to have high operation ability. Therefore, it is possible to process a large amount of processing necessary to process an increased number of colors and three dimensional processing that cannot be done on the main CPU in the video entertainment system unit.

The invention makes it possible for three CPUs—two sub CPUs and the main CPU—to do parallel processing by the interface. This improves the operation ability.

The invention display a display image from the adapter in front of a display image from the video entertainment system unit, when for example, the priority bit is set to 1. When the through bit of each pixel in the part of the display image is set to 1, if the color information bit is set to 1 (the display image from the video entertainment system unit is not transparent), only that part of the display image from the video entertainment system unit is displayed in front of the display image from the adapter.

Therefore, because this invention compares the priority of a display image from the video entertainment system unit with that of a display image from the adapter on a pixel basis, it makes possible to exchange only some parts of two display images, changing the priority on a pixel bases.

The invention makes the high-performance second VDP control the background where many colors are used or for three-dimensional images such as polygons that are too difficult to represent with first VDP in the video entertainment system unit, while it makes the conventional VDP in the video entertainment system unit control game scores or characters where many colors are not used. Therefore, the image processing capability is increased.

BRIEF DESCRIPTION OF THE DRAWINGS

FIG. 3 shows an example of a data format.

FIG. 4 shows an example of determination performed by the priority determination circuit.

FIG. 5 shows display image A and display image B.

DESCRIPTION OF THE PREFERRED EMBODIMENTS (1) Configuration of an embodiment

Figure 1:
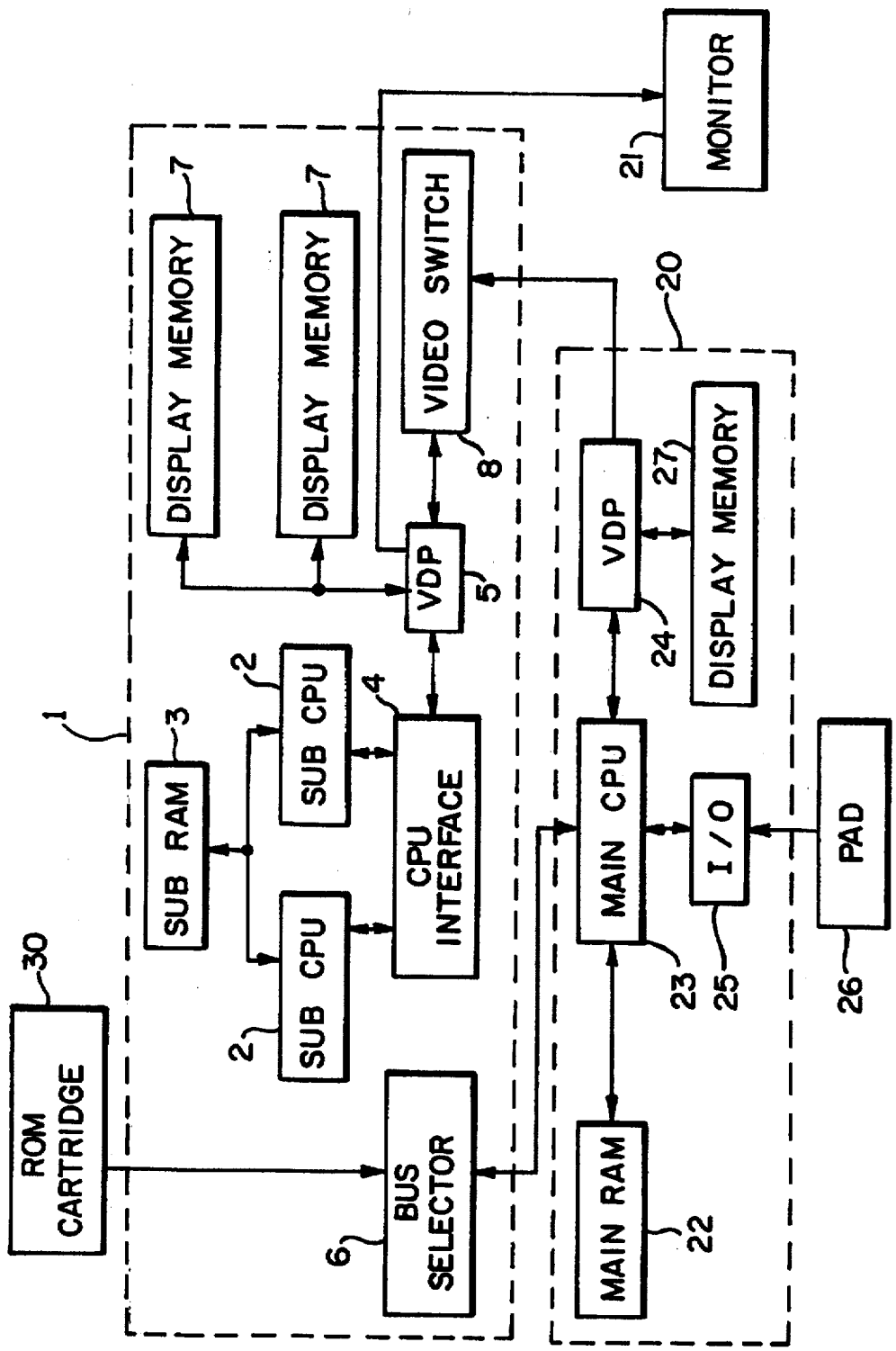
FIG. 1 is a configuration diagram of an embodiment of a video entertainment system embodying the present invention.

Referring to the attached drawings, there is shown a preferred embodiment of a video entertainment system adapter according to the present invention. FIG. 1 shows a configuration of a video entertainment system using the adapter 1 of this embodiment. A video entertainment system, consisting of the adapter 1, the video entertainment system unit 20, and the monitor 21 on which images are displayed, allows a game player to attach the ROM cartridge 30 to execute a video entertainment program on the screen of the monitor 21.

Configuration of Video Entertainment System Unit 20

First, the video entertainment system unit 20 is explained. The video entertainment system unit 20 contains the main RAM 22 where program data and image data are stored, the main CPU 23 which executes a program and generates image data, and the first VDP 24. The first VDP 24, which has one control screen, controls display images on the video entertainment system unit 20 based on image data generated by the main CPU 23. The control pad 26 (command input means) is connected to the main CPU 23 via the I/O port 25. The first VDP 24 has the display memory 27.

Configuration of the Adapter 1

(Overall Configuration of the Adapter 1)

The adapter 1 contains two sub CPUs 2 and 2 which generate image data and sub RAM 3 which contains program data necessary for the operation of the sub CPUs 2 and 2 and image data generated by the sub CPUs 2 and 2. The CPU interface 4 is connected to each of the sub CPUs 2 and 2 to connect these sub CPUs 2 and 2 to the main CPU 23 in the video entertainment system system unit. The second VDP 5 and the bus selector 6 are connected to the CPU interface 4. Two display memory units 7 and 7 are connected to the second VDP 5, and the video switch 8 is connected for use as the image selection means.

(Second VDP 5)

The second VDP 5, which controls display images on the adapter 1 based on image data generated by the sub CPUs 2, has a two-screen 1M-byte frame buffer for use as a control screen. For the second VDP 5, there are more colors, and the display memory transfer ability is higher, than that of the VDP 24 in the video entertainment system 20. In addition, the second VDP 5 determines the priority, on a pixel basis, between display image from the video entertainment system unit 20 controlled by the first VDP 24 and display image from the adapter 1 controlled by the second VDP5. That is, the second VDP 5 functions also as the priority determination means.

Figure 2:
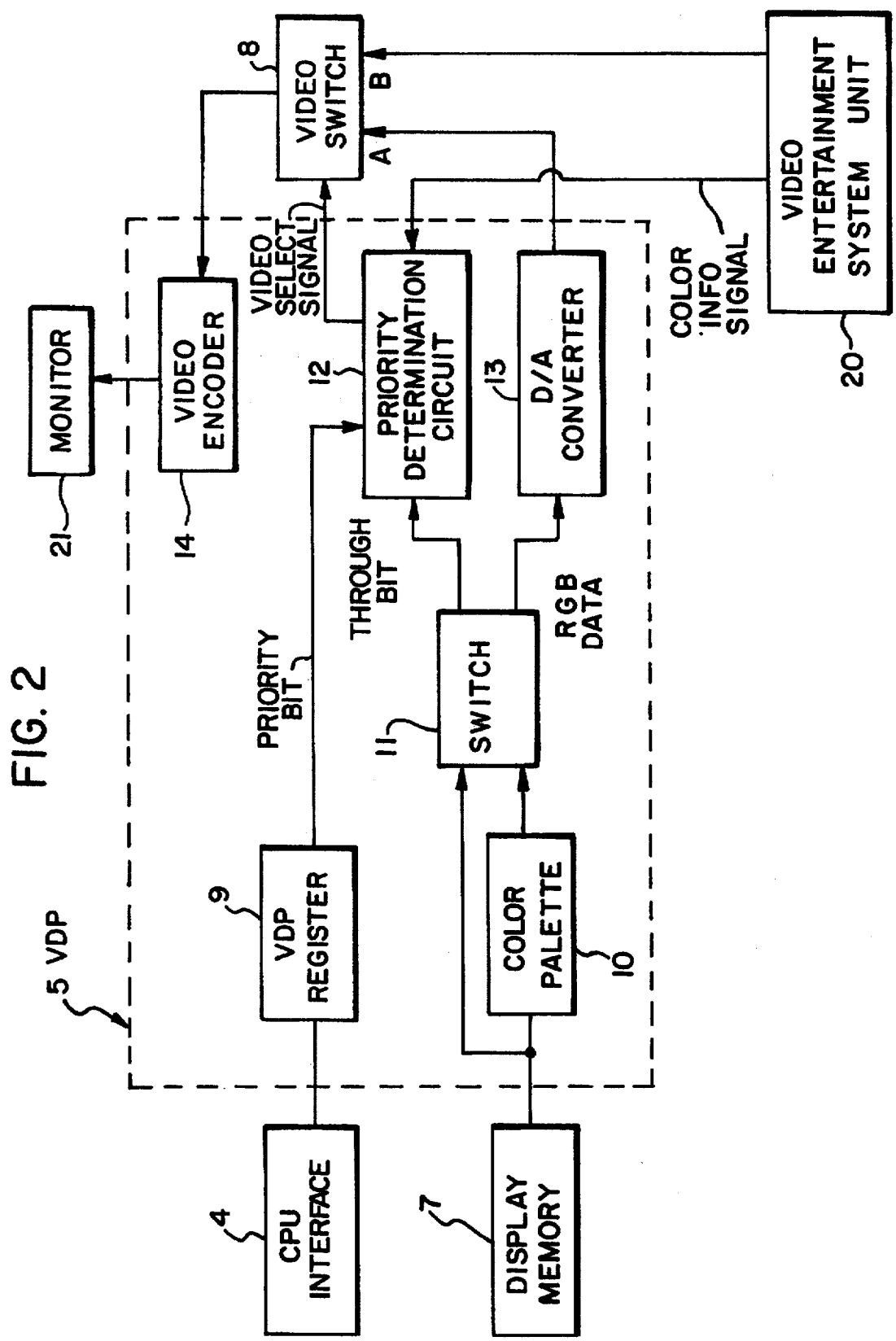
FIG. 2 is a configuration diagram of the second VDP 5 of an embodiment.

Referring to FIG. 2, there is shown an internal configuration of the second VDP 5. The second VDP 5 contains the VDP register 9 connected to the CPU interface 4 and the color palette 10 and the switch 11 connected to the display memory 7. The VDP register 9 is connected to the priority determination circuit 12, and the one-bit priority bit is sent from the VDP register 9 to the priority determination circuit 12. The priority bit, a signal specifying whether a display image from the adapter 1 be displayed behind or in front of a display image from the video entertainment system unit 20, is set in the VDP register 9 by the sub CPU 2 according to data determined for each scene by the program in the ROM cartridge 30. Note that a display image on the adapter 1 becomes transparent when blanks are specified in the VDP register 9.

The color palette 10, connected to the switch 11, contains 16-bit color data. This color palette 10 is used to specify one of 0 to 255 colors for each pixel. The switch 11 contains image data sent from the display memory 7, or color data sent from the color palette 10.

FIG. 3 shows a data format. The format consists of five-bit R, G, and B data and one-bit through bit. The through bit, if set to 1, causes the pixel of the specified color to be displayed on the display image not from the video entertainment system 20. The switch 11 is connected to the priority determination circuit 12 and to the D/A converter 13. The through bit is sent to the priority determination circuit 12, and the R, G, and B signals to the D/A converter.

In addition to the priority bit and the through bit, the color information signal is sent from the video entertainment system unit 20 to the priority determination circuit 12. When the color code is 0, the display image from the video entertainment system unit 20 is transparent. When both a display image from the adapter 1 and a display image from the video entertainment system unit 20 are transparent, the display image from the video entertainment system unit 20 is displayed if specified as the background image.

The video select signal which indicates the result of determination is sent from the priority determination circuit 12 to the video switch 8 which is connected to it. FIG. 4 shows an example of determination performed by the priority determination circuit 12. The table in this example shows which display screen is displayed, where a display image from the adapter 1 is represented by "A" and that from the video entertainment system unit is represented by "B".

The second VDP 5 contains the video encoder 14 that is used as video signal generation means. This video encoder 14 receives the TV signal from the video switch 8 and sends it to the monitor 21.

(Video Switch 8)

The video switch 8, an image selection means, selects one of two display images, either a display image from the video entertainment system unit 20 or a display image from the adapter 1, which will appear in front of the other according to the determination of the priority determination circuit 12. The video switch 8 receives the R, G, and B signals (indicated by A and B in FIG. 2) from the D/A converter or the video entertainment system unit.

(Bus Selector 6)

The bus selector 6, connected to the main CPU 23, receives commands from the main CPU 23 to activate the CPU interface 4. The main CPU 23 in the video entertainment system unit determines whether to use the adapter 1. Only when it is used, the main CPU 23 activates the CPU interface 4 in the adapter 1 via the bus selector 6. When it is not used, sub CPUs 2 and 2 enter the low-power mode.

When the bus selector 6 receives access requests from two sub CPUs 2 and 2 at the same time, it accepts a request that arrives first and places the other request in the wait state. After the first request is terminated, the bus selector 6 sends the other request to the CPU interface 4. In this way, the bus selector 6 performs bus arbitration.

(2) Operation of the embodiment

The operation of this embodiment with the above configuration is as follows. The main CPU 23, which uses the adapter 1 that is installed on the video entertainment system unit 20, issues a command to the bus selector 6 to activate the CPU interface 4. The CPU interface 4, activated by the bus selector 6, connects the sub CPUs 2 and 2 in the adapter 1 to the main CPU 23 in the video entertainment system unit 20.

The main CPU 23 in the video entertainment system unit 20 generates image data. Based on this data, the first VDP 24 controls display images on the video entertainment system unit 20. On the other hand, the sub CPUs 2 and 2 in the adapter 1 generates image data. Based on this data, the second VDP 5 controls display images in the adapter 1.

With these two VDPs, 24 and 5, controlling independent display images as described above, the priority determination circuit 12 compares the priority of a display image from the video entertainment system unit 20 with the priority of a display image from the adapter 1, on a pixel basis, according to the following three signals:

[1] Through bit in image data from the display memory 7 or in the color data in the color palette 10

[2] Color information signal from the video entertainment system unit 20

[3] Priority bit (signal) from the VDP register 9 And, as the determination result, the priority determination circuit 12 sends the video select signal to the video switch 8. The video switch 8 selects one of two display images that is to be brought to the front and sends the TV signal to the video encoder 14. Then, the monitor 21 displays a display image on a pixel basis with the selected display image to the front.

Figure 6:
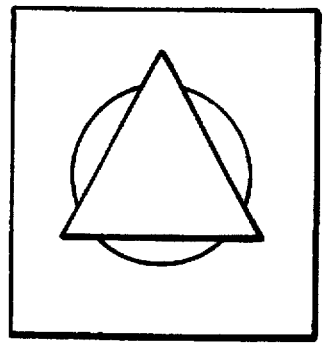
FIG. 6 shows a composite display image with display A on display image B.

For example, as shown in FIG. 5, when composing display image A from the adapter 1 and display image B (the color code inside the triangle is 0, and the color code outside the triangle is 0) from the video entertainment system unit 20 with the latter on the former, the priority bit is set to 0. In this case, because the color code outside the triangle in display image B is 0, the underlying display image A is displayed (see FIG. 6).

Figure 7:
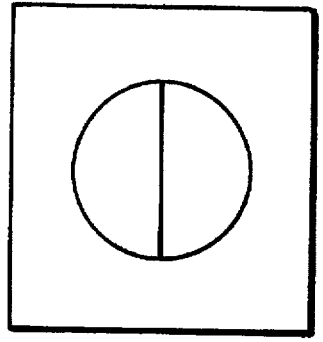
FIG. 7 shows display image C and display image B.
Figure 7:
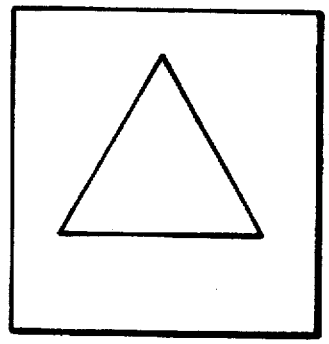
Figure 8:
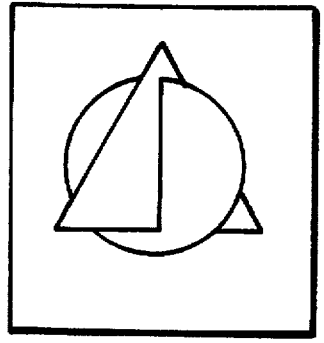
FIG. 8 a composite display image of display image C and display image B.

When two display images are composed with some through bits set to 1, the priorities of the corresponding part of a display image are reversed. For example, in FIG. 7, the through bit of the left half of the circle in display image C is 0, and that of the right half is 1. In this case, when composing display image C and display image B, the display image shown in FIG. 8 is obtained.

In this embodiment, the priority determination circuit 12 compares the priority of a display image from the video entertainment system unit 20 with that from the adapter 1 on a pixel basis. The video switch 8 selects one of two display images, pixel by pixel, to allow the monitor 21 to display the image while changing the priority of each pixel. In addition, because both the adapter 1 and the video entertainment system unit 20 have a CPU and a VDP, this embodiment is compatible even when the amount of data processing increases as the number of colors increases or three-dimensional processing must be performed.

Because not only the main RAM 22 in the video entertainment system unit 20 but also the sub RAM 3 in the adapter 1 is provided, each CPU (2, 2, 23) has its own RAM. This configuration as well as the CPU interface 4 makes it possible for each CPU in the adapter 1 and the CPU in the video entertainment system unit 20 to do parallel processing.

In addition, the adapter 1 is not activated unless the bus selector 6 receives a command, which activates the CPU interface 4, from the main CPU 23 in the video entertainment system unit 20. While the adapter 1 is not activated, the main CPU 23 remains connected directly to the ROM cartridge 30. This means that the video entertainment program in the ROM cartridge 30 may be executed without having to remove the adapter 1 from the video entertainment system unit 20 even when the program does not need the adapter 1.

(3) Effect of the Embodiment

The effect of the embodiment is as follows:

1 This embodiment provides the VDP 5 in the adapter 1 which has more colors and higher memory transfer ability than the VDP 24 in the video entertainment system unit 20, increasing display image performance.

2 This embodiment has two sub CPUs 2 and 2 in the adapter 1 to provide higher operation ability. Therefore, those CPUs can process a large amount of processing necessary to process an increased number of colors and three-dimensional processing that cannot be done on the CPU 23 in the video entertainment system unit 20.

3 The CPU interface 4 makes it possible for three CPUs— two sub CPUs 2 and 2 and the main CPU 23—to do parallel processing, improving the operation ability.

4 Because a large amount of processing necessary for processing an increased number of colors as well as three-dimensional processing can be performed in this embodiment, processing can be divided between VDPs as follows. That is, the high-performance VDP 5 in the adapter 1 is responsible for the background where many colors are used or for three-dimensional images such as polygons that are too difficult to represent with the VDP24 in the video entertainment system unit 20, while the conventional VDP 24 in the video entertainment system unit 20 is responsible for game scores or characters where many colors are not used. This division of processing increases the image processing capability.

5 This embodiment compares the priority of a display image on the video entertainment system unit 20 with that of a display image on the adapter 1 on a pixel basis. Therefore, it is possible for a sprite, such as a game character displayed and controlled by the VDP 24 in the video entertainment system unit 20 to move freely in the fine background image displayed and controlled by the VDP 5 in the adapter 1; it is also possible to exchange only some parts of two display images. This results in a sophisticated screen effect, enabling the embodiment to process a sophisticated video entertainment program.

6 In addition, this embodiment eliminates the need for the adapter 1 to be removed from the video entertainment system unit 20 when a video entertainment program not requiring the adapter 1 is executed, ensuring ease of use.

(4) Other embodiments

It should be understood that the invention is not limited to the embodiment described above and that changes in component form or the number of installations can be made without departing from the spirit of the invention.

[Effect of the Invention]

This invention allows a sprite, such as a game character, displayed and controlled by one of two VDPs to move freely in front of the fine background image displayed and controlled by the other VDP and to exchange some parts of the foreground and the background by providing the priority determination means and the image selection means. The priority determination means compares, on a pixel basis, the priority of a display image controlled by the VDP in the video entertainment system unit with that of a display image from the VDP in the adapter, and the image selection means displays either a display image from the video entertainment system unit or a display image from the adapter in front of the other according to the priority determined by the priority determination means. Thus, this invention enhances the operation ability and the image output performance.

What is claimed is:

1. A video entertainment system adapter for use on a video entertainment system comprising image display means for displaying images, main RAM for storing program data and image data, a main CPU for executing programs and for generating image data, and a first video display processor for controlling display images according to image data generated by the main CPU, said video entertainment system adapter comprising:

sub CPU for generating image data;

a second video display processor for controlling display images on the adapter according to image data generated by the sub CPU;

an interface for connecting said sub CPU and said main CPU;

priority determination means for comparing the priority of a display image from the unit of said video entertainment system with the priority of a display image from said adapter on a pixel basis; and image selection means for selecting one of two display images, either a display image from the video entertainment system unit or a display image from the adapter, to be displayed in front of the other according to the priority determined by said priority determination means.

2. A video entertainment system adapter as claimed in claim 1, further comprising sub RAM for storing program data required for said sub CPU to run and image data controlled by said sub CPU.

3. A video entertainment system adapter as claimed in claim 1, further comprising a bus selector for activating said interface with the use of commands from said main CPU.

4. A video entertainment system adapter as claimed in claim 1, wherein said second video display processor has more colors and higher display image transfer ability than that of said fast video display processor.

5. A video entertainment system adapter as claimed in claim 1, wherein said sub CPU consists of two sub CPUs.

6. A video entertainment system adapter as claimed in claim 5, wherein said interface makes said sub CPUs and said main CPU do parallel processing.

7. A video entertainment system adapter as claimed in claim 1, wherein said second video display processor sets on a pixel basis the priority bit, a signal specifying whether a display image from the adapter be displayed behind or in front of a display image from the video entertainment system unit, the through bit, and a signal specifying whether said priority bit of the display image is reversed according to the image data generated by said sub CPU; and said priority determination means compares the priority based on said priority bit, said through bit, and the color information signal sent from said fast video display processor, a signal specifying whether the display image from the video entertainment system unit is transparent.

8. An image display method of a video entertainment system using a video entertainment system adapter of displaying image by connecting an video entertainment system adapter having a CPU and a video display processor to a video entertainment system unit, which generates image data and displays image based on the image data, said video display method of a video entertainment system comparing the steps of:

setting the priority bit, a signal specifying whether a display image from the adapter be displayed behind or in front of a display image from the video entertainment system unit, the through bit, a signal specifying whether said priority bit of the display image is reversed, and the color information signal, a signal specifying whether the display image from the video entertainment system unit is transparent;

comparing the priority of a display image from said video entertainment system unit with the priority of a display image from said adapter on a pixel basis, according to said priority bit, said through bit, and said color information bit; and displaying one of two display images in front of the other, either a display image from the video entertainment system unit or a display image from the adapter according to the priority determined.

9. An image display method of a video entertainment system using a video entertainment system adapter as claimed in claim 8, wherein a second video display processor which has more colors and higher display image transfer ability than that of a first video display processor of said video entertainment system unit is provided;

image including game scores and characters where many colors are not used are controlled by said first video display processor; and the background where many colors are used and three-dimensional images are controlled by said second video display processor.

10. A video entertainment system adapter as claimed in claim 2, further comprising a bus selector for activating said interface with the use of commands from said main CPU.

11. In a video entertainment system for playing video programs with an operator control of a sprite on a background image having an image display means for displaying video images, a first RAM for storing video program data and image data, a first CPU for executing programs and for generating an image, an operator input controller pad, and a first video display processor for controlling display images according to image data generated by the first CPU, the improvement of an adapter unit comprising:

interface means for removably connecting the adapter unit to the video entertainment system;

means for connecting a ROM cartridge, storing program data, to the adapter unit;

a second CPU for generating image data from the program data;

a second video display processor for controlling display images in the adapter unit according to image data generated by the second CPU;

a second RAM for storing program data and image data controlled by the second CPU, wherein the second video display processor includes a priority determination means for comparing a predetermined priority of a display image from the first CPU with a predetermined priority of a display image from the second CPU on a pixel basis;

image selection means for selecting one of the first CPU display image data and second CPU display image data on the basis of the priority determination;

means for determining whether the program data in the ROM is to be executed by the second CPU and if not, directing the program data directly to the first CPU; and video encoder for directing the display of the respective display images from the first and second video display processors in accordance with an output from the priority determination means.

12. A video entertainment system adapter as claimed in claim 1, further comprising a bus selector for activating said interface only when said main CPU determines to use the adapter, and for not activating said interface and said sub CPU when said main CPU does not determine to use the adapter.

13. A video entertainment system adapter as claimed in claim 2, further comprising a bus selector for activating said interface only when said main CPU determines to use the adapter, and for not activating said interface and said sub CPU when said main CPU does not determine to use the adapter.

14. A video entertainment system adapter as claimed in claim 4, wherein said second video display processor controls images of a plurality of colors and controls the generation of three-dimensional images.

15. A video entertainment system adapter for use on a video entertainment system including image display means for displaying images, a main RAM for storing program data and image data, a main CPU for executing programs and for generating image data, and a first video display processor for controlling display images according to image data generated by the main CPU, said video entertainment system adapter comprising:

a sub CPU for generating image data;

a second video display processor for controlling display images in the adapter according to image data generated by the sub CPU, the second video display unit having priority determination means for comparing a priority of a display image generated by said main CPU of said video entertainment system with a priority of a display image generated by said adapter on a pixel basis;

an interface for connecting said sub CPU and said main CPU; and image selection means for selecting one of two display images, either a display image from the video entertainment system or a display image from the adapter, the selected display image to be displayed in front of the other according to the priority determined by said priority determination means.

16. A video entertainment system adapter as claimed in claim 15, wherein said second video display processor further comprises:

a register for setting a priority bit by said sub CPU on a pixel basis as a priority bit signal specifying whether a display image from the adapter is to be displayed behind or in front of a display image from the video entertainment system unit;

color data palette storage means for storing color data comprising a color information signal and a through bit signal specifying whether said priority bit of the display image is reversed; and switching means for sending said through bit signal to said priority determination means, and said color palette information signal to said image selection means, either said color data palette in said color data storage means or the image data generated by said sub CPU comprising said color information and said through bit, said priority determination means is sent a color information signal from said first video display processor specifying whether the display image from the video entertainment system unit is transparent, and compares the priority based on said priority bit signal, said through bit signal, and said color information signal.

17. A video entertainment system adapter as claimed in claim 15, further comprising a bus selector for activating said interface only when said main CPU determines to use the adapter, and for not activating said interface when said main CPU does not determine to use the adapter.

18. In a video entertainment system for playing video programs with an operator control of a sprite on a background image having an image display means for displaying video images, a first RAM for storing video program data and image data, a first CPU for executing programs and for generating an image with the first RAM, an operator input controller pad, and a first video display processor for controlling display images according to image data generated by the first CPU, including providing a color information signal, the improvement of an adapter unit comprising:

interface means for removably connecting the adapter unit to the video entertainment system;

means for connecting a ROM cartridge, storing program data, to the adapter unit;

a second CPU for generating image data from the program data;

a second video display processor for controlling display images in the adapter unit according to image data generated by the second CPU, including providing a priority signal and through signal;

a second RAM for storing program data and image data controlled by the second CPU, wherein the second video display processor includes a priority determination means for comparing a predetermined priority of a display image from the first CPU with a predetermined priority of a display image from the second CPU on a pixel basis by processing the color information signal, priority signal, and through signal;

image selection means for selecting one of the first CPU display image data and second CPU display image data on the basis of the priority determination;

means for determining whether the program data in the ROM is to be executed by the second CPU and if not, directing the program data directly to the first CPU; and video signal generator for directing the display of the respective display images from the first and second video display processors in accordance with an output from the priority determination means.

19. A video entertainment system for playing video programs with an operator control of a sprite on a background image having an image display means for displaying video images, comprising:

a first RAM for storing video program data and image data;

a first CPU for executing programs from the first RAM and for generating image data, including a first priority signal;

a first video display processor for controlling display images according to image data generated by the first CPU;

an adapter unit;

interface means for removably connecting the adapter unit to the first CPU;

means for removably connecting a ROM cartridge, storing program data, to the adapter unit, the adapter unit including:

a second CPU for generating image data from the program data;

a second video display processor for controlling display images in the adapter unit according to image data generated by the second CPU and generating a second priority signal and a third priority signal;

a second RAM for storing program data and image data controlled by the second CPU;

wherein the second video display processor includes a priority determination means for comparing a predetermined priority of a display image from the first CPU with a predetermined priority of a display image from the second CPU on a pixel basis by comparing the respective three priority signals;

image selection means for selecting one of the first CPU display image data and second CPU display image data on the basis of the priority determination;

means for determining whether the program data in the ROM is to be executed by the second CPU and if not, directing the program data directly to the first CPU; and a video signal generator for directing the display of the respective display images from the first and second video display processors.

20. In a video entertainment system for playing video programs with an operator control of a sprite on a background image having an image display means for displaying video images, a first RAM for storing video program data and image data, a first CPU for executing programs and for generating an image, an operator input controller pad, and a first video display processor for controlling display images according to image data generated by the first CPU, the improvement of an adapter unit comprising:

interface means for removably connecting the adapter unit to the video entertainment system;

means for removably connecting a ROM cartridge, storing program data, to the adapter unit;

a second CPU for generating image data from the program data in parallel with the generation of image data by the first CPU;

a second video display processor for controlling display images in the adapter unit according to image data generated by the second CPU;

a second RAM for storing program data and image data controlled by the second CPU, wherein the second video display processor includes a priority determination circuit for comparing a predetermined priority of a display image from the first CPU with a predetermined priority of a display image from the second CPU on a pixel basis;

image selection means for selecting one of the first CPU display image data and second CPU display image data on the basis of the priority determination;

means for determining whether the program data in the ROM is to be executed by the second CPU and if not, directing the program data directly to the first CPU; and a video encoder for directing the display of the respective display images from the first and second video display processors.

21. In a video entertainment system for playing video programs with an operator control of a sprite on a background image having an image display means for displaying video images, a first RAM for storing video program data and image data, a first main CPU for executing programs and for generating an image, including a color information bit signal, an operator input controller pad, and a first video display processor for controlling display images according to image data generated by the first CPU, the improvement of an adapter unit for the parallel processing of image data comprising:

interface means for removably connecting the adapter unit to the video entertainment system;

means for removably connecting a ROM cartridge, storing program data, to the adapter unit;

a second CPU, including first and second sub CPUs for generating image data from the program data in parallel with the operation of the first main CPU;

a second video display processor for controlling display images in the adapter unit according to image data generated by the second CPU and providing a first bit signal and a second bit signal;

a second RAM for storing program data and image data controlled by the second CPU, wherein the second video display processor includes a priority determination circuit for comparing a predetermined priority of a display image from the first CPU with a predetermined priority of a display image from the second CPU based on the combination of the color information bit signal, the first bit signal and second bit signal on a pixel basis;

image selection means for selecting one of the first CPU display image data and second CPU display image data on the basis of the priority determination;

means for determining whether the program data in the ROM is to be executed by the second CPU and if not, directing the program data directly to the first CPU; and a video encoder for directing the display of the respective display images from the first and second video display processors in accordance with an output from the priority determination means.

* * * * *